United States Patent
Okada

(10) Patent No.: US 6,608,460 B1
(45) Date of Patent: Aug. 19, 2003

(54) METHOD OF DRIVING HEAD, HEAD DRIVING DEVICE AND DISC DRIVING APPARATUS USING THE SAME METHOD AND DEVICE

(75) Inventor: Shuhei Okada, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/763,508

(22) PCT Filed: Jun. 21, 2000

(86) PCT No.: PCT/JP00/04042
§ 371 (c)(1),
(2), (4) Date: Jul. 9, 2001

(87) PCT Pub. No.: WO00/79534
PCT Pub. Date: Dec. 28, 2000

(30) Foreign Application Priority Data

Jun. 23, 1999 (JP) ............................................ 11-176454

(51) Int. Cl.$^7$ ................................................ G05B 19/10
(52) U.S. Cl. .................... 318/567; 318/568.18; 318/569
(58) Field of Search ........................... 318/567, 568.18, 318/569; 360/77.02, 77.12, 78.04, 78.08, 78.12

(56) References Cited

U.S. PATENT DOCUMENTS 4,679,103 A * 7/1987 Workman ................ 360/78.07
5,151,639 A * 9/1992 Hasegawa et al. ..... 318/568.18

FOREIGN PATENT DOCUMENTS

| EP | 293809 | 12/1988 |
| EP | 441407 | 8/1991 |
| EP | 800128 | 10/1997 |
| JP | 08124329 | 5/1996 |

* cited by examiner

Primary Examiner—Khanh Dang
(74) Attorney, Agent, or Firm—RatnerPrestia

(57) ABSTRACT

A method for driving a head includes the steps of: determining a head-present-position by a head-position-data supplied from a head-position-detector; calculating in advance a target-sector accessible-time by the head for a first time based on a data of a head-present-position, a location data of a target sector at a destination and a driving capability of a head assembly; and controlling a head-assembly-driver by determining a moving speed and an acceleration/deceleration pattern of the head for completing a seek to a track including the target sector within the accessible-time. The method is useful for controlling the head of a disc driving apparatus, especially a magnetic head of a magnetic disc driving apparatus, and the method reduces power consumption at a seek-operation without extending an access time.

12 Claims, 4 Drawing Sheets

METHOD OF DRIVING HEAD, HEAD DRIVING DEVICE AND DISC DRIVING APPARATUS USING THE SAME METHOD AND DEVICE

FIELD OF THE INVENTION

The present invention relates to controlling a speed of a head which is used for magnetic disc drives and other disc drives. More particularly it relates to a method of driving head, a head driving device and a disc driving apparatus using the same method and device. When an access to a designated sector is required, the present invention allows the method of driving the head, the head driving device and the disc driving apparatus using the same method to reduce power consumption at seek-operation free from extending an access time to the designated sector.

BACKGROUND OF THE INVENTION

When a demand for reading/writing any sector on a disc occurs, a conventional magnetic-disc-driving apparatus moves a magnetic head from a present position to a track including a target sector, within a shortest time, and when the disc rotates thereby the target sector arrives at a position accessible by the magnetic head, the magnetic head reads/writes data in the target sector. (Hereinafter the track including a target sector, or the track a target sector is in is refereed to simply as TTS.) Therefore, in any cases for reading/writing, the conventional magnetic-disc-driving apparatus has required a waiting time from an instant when the magnetic head finishes a seek-operation to TTS, to another instant when the disc rotates thereby the target sector arrives at the position the magnetic head can read/write data.

In order to reduce such a waiting time, the following methods have been employed. When the magnetic-disc-driving-apparatus reads/writes across two tracks or more in series, for example, when the disc-driving-apparatus finished reading/writing a first track and then reads/writes a second track continuously, the apparatus places the leading sector of the second track at a position so that a seek-time for the head from the first track to the second track can be minimized. This mechanics reduces the waiting times required at each access sequentially to sectors across the tracks. However, this mechanics cannot reduce the waiting times at random accesses.

When the magnetic-disc-driving-apparatus reads/writes any sector on the disc, a circuit of read/write data—necessary for reading/writing a sector—must be activated. In order to save the power, a method is available for activating the circuit only when the sector is engaged in read/write. The disc driving apparatus using this method turns on the circuit of read/write data at a predetermined timing such as before, after, during the seek, or just before reading/writing the sector, and the disc driving apparatus turns off the circuit at a timing the magnetic disc finishes reading/writing. As a result, the power consumption is reduced.

Although the conventional magnetic-disc-driving-apparatus cannot access to a target sector until the head arrives at a position accessible to a target sector, the driving apparatus moves the head to TTS in a minimum time responding to each media-access-demand. The disc driving apparatus requires large force to move a head assembly to TTS at a maximum speed. In other words, the disc driving apparatus feeds large current to a head assembly-drive-circuit every time the head moves. Therefore the power consumption during the seek-operation becomes greater, and this inversely affects the efforts of lowering the power consumption.

The circuit of read/write data requires a time until the circuit of read/write data gets to work normally. Therefore, in a case of employing a control method that turns on the circuit of read/write data at a predetermined timing, without considering the times such as the seek-time the head moves to TTS, the time until the head arrives at a position accessible to the target sector after a seek-operation, or the time until the circuit of read/write data gets to work normally and so on, the following inconveniences may occur: Depending on a target sector position after finishing the seek-operation and a startup timing for the circuit of read/write data, although the head already arrived at the position accessible to the target sector, the disc must wait to rotate because the circuit of read/write data is not ready for an operation. The circuit of read/write data is thus obliged to stay activated unnecessarily long. These factors impede lowering the power consumption.

DISCLOSURE OF THE INVENTION

A method for driving a head of the present invention resolves the problems mentioned above, and the method comprises the following steps:

(a) a step for determining a head position by head-position-data supplied from a head-position-detector;

(b) a step for calculating in advance a time the head can access to a target sector of a disc for the first time, based on the data of the head-present-position, location data of the target sector at a destination, and driving capability of the head assembly; and (c) a step for controlling a head-assembly-driver by determining a moving-speed and acceleration/deceleration pattern for the head so as to finish the seek-operation to TTS (the track including a target sector) during the time mentioned in (b).

More specifically, the method comprises the steps as follows:

(a) a step for determining a minimum integer N of integers each of which holds a relation:

(a target-sector-accessible-time ) $\geqq$ (a shortest time for the head to move to TTS), Assume that a sector-arrival-time is a necessary time from an instant the head starts moving to TTS to another instant the disc rotates thereby the target sector arrives at a position the head can access to for the first time, and the target-sector-accessible-time is a sum of the sector-arrival-time and a rotation-waiting-time (latency), where the latency is obtained by multiplying a disc-rotation-period by an integer N (zero or greater than zero);

(b) a step for moving the head by determining the moving-speed and acceleration/deceleration pattern of the head so as to finish a head-moving and a head-positioning to TTS within the target-sector-accessible-time determined by substituting the integer N into a formula:

(the sector-arrival-time+the disc-rotation-period×the integer $N$)

In comparison with conventional methods, the method of the present invention can provide a method realizing a reduction of power consumption during a seek time without extending an access time.

A head driving device of the present invention comprises the following elements:

(a) a head accessing to a disc;
(b) head-position detecting means for finding a head-present-position
(c) target-sector-accessible-time calculation means for calculating a target-sector-accessible-time, in advance, the head can access to a target sector for the first time, based on head-present-position data, location data of the target sector at a destination, and driving capability of the head assembly; and
(d) control means for controlling a head-assembly-driver by determining a moving-speed and acceleration/deceleration pattern for the head so as to finish a seek-operation to TTS during the time described in (c).

More specifically, the head driving device comprises the following elements:
(a) a head accessing to a disc;
(b) target-sector-accessible-time calculating means for determining a minimum integer N that holds a relation:
(the target-sector-accessible-time)≧(a shortest time the head moves to TTS),
where a sector-arrival-time is defined as a necessary time from a instant the head starts moving to TTS to another instant the disc rotates thereby the target sector arrives at a position the head can access to for the first time, and
the target-sector-accessible-time is a sum of the sector-arrival-time and a latency, where the latency is obtained by multiplying a disc-rotation-period by an integer N (zero or greater than zero);
(c) control means for moving the head by determining the moving-speed and acceleration/deceleration pattern of the head so as to finish a head-moving and a head-positioning to TTS within the target-sector-accessible-time determined by substituting the integer N into a formula:

(the sector-arrival-time+the disc-rotation-period×the integer $N$)

In comparison with conventional devices, the present invention provides a head driving device realizing a reduction of power consumption during a seek time without extending an access time.

A disc driving apparatus of the present invention comprises the following elements:
(a) a spindle unit for rotating a disc; and
(b) a head driving device, the device including the structure discussed above.

In comparison with conventional apparatuses, the present invention provides a disc driving apparatus realizing a reduction of power consumption during a seek time without extending an access time.

DESCRIPTION OF THE PREFERRED EMBODIMENT

Exemplary embodiments of the present invention are described hereinafter with reference to the accompanying drawings.

First Exemplary Embodiment

Figure 1:
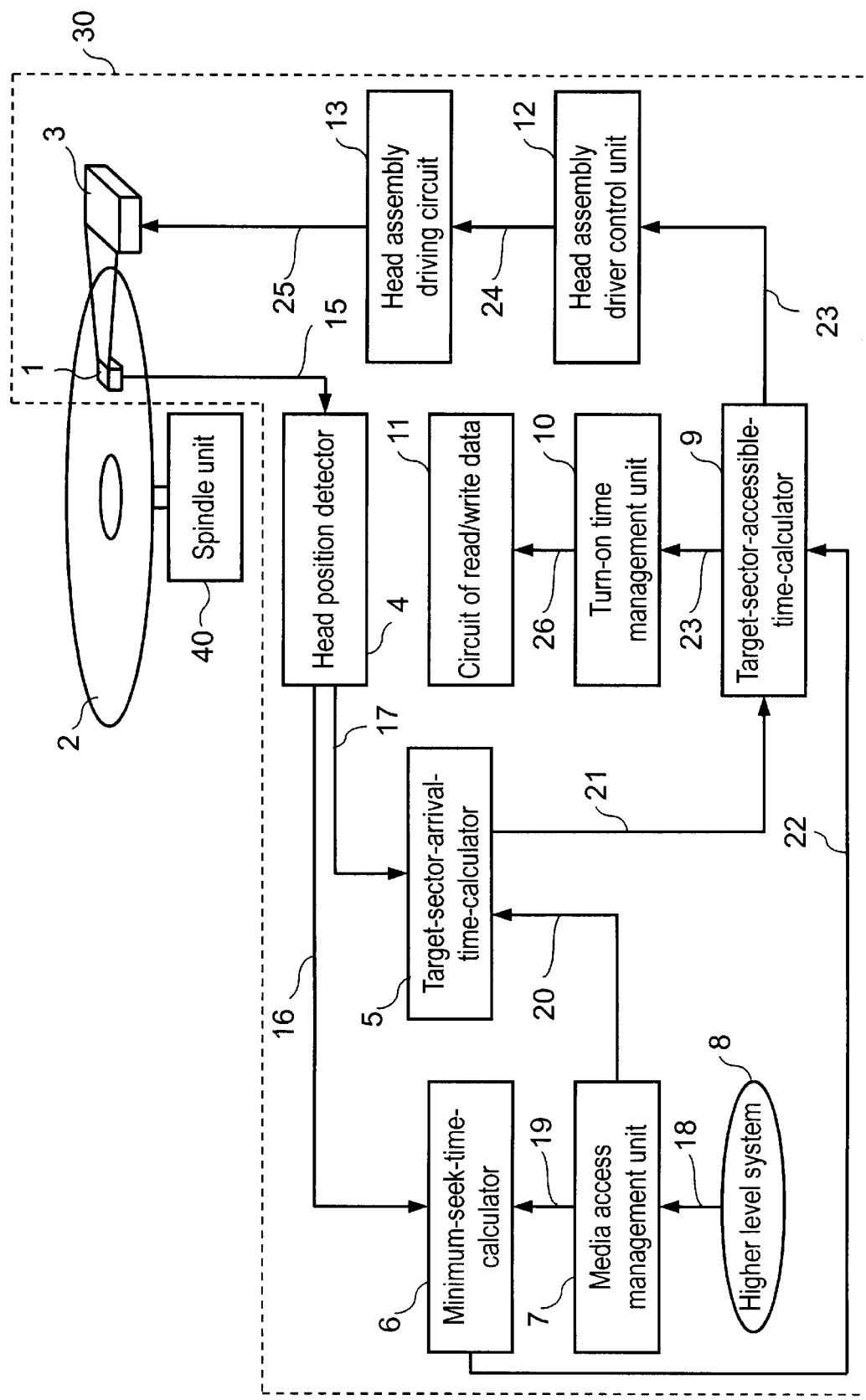
FIG. 1 is a block diagram of a disc driving apparatus in accordance with an embodiment of the present invention.

FIG. 1 shows a block diagram of a magnetic-disc-driving-apparatus as an example of a disc-driving-apparatus in accordance with the first embodiment of the present invention. The magnetic disc driving apparatus in FIG. 1 includes spindle unit 40 which rotates magnetic disc 2 (hereinafter refereed to simply as disc, 2) and head driving device 30 which drives head assembly 1 (hereinafter refereed to simply as head 1).

Media access management unit 7 receives command 18 for accessing to designated sector from higher level system 8, and then calculates data 19 indicating a location of a track including a target sector (TTS) at a destination, and data 20 indicating a location of the target sector in the track. Management unit 7 outputs data 19 to minimum-seek-time-calculator 6, and outputs data 20 to target-sector-arrival-time-calculator 5 respectively.

Head position detector 4 reads data 15 from disc 2 via head 1, and then calculates data 16 indicating a present track position and data 17 indicating a head position on the present track. Detector 4 outputs data 16 to minimum-seek-time-calculator 6, and outputs data 17 to target-sector-arrival-time-calculator 5 respectively.

Calculator 6 calculates minimum seek time 22 from present track to TTS (the track including a target sector), based on data 19, data 16, and the driving capability pre-determined of the head assembly of the disc-driving-apparatus of the present invention, and then outputs the minimum seek time 22 to target-sector-accessible-time-calculator 9. Calculator 5 calculates time 21 necessary for the target sector to arrive at a position accessible by the head for the first time, based on data 20, data 17, and rotation period of disc 2, and then outputs time 21 to calculator 9. Where the driving capability of the head assembly refers to a value determined by e.g. the inertia of head assembly 1, a driving force of head assembly driver 3 (for example: an actuator comprising a coil and a magnet), and so on.

Calculator 9 determines a minimum integer N (zero or greater than zero), which holds the following relation based on time 21, minimum seek time 22, and rotation period of disc 2 rotated by spindle unit 40: (a time until the target sector arrives at the position accessible by the head for the first time, i.e. time 21+a rotation period of the magnetic disc drive×the integer N)≧(the minimum seek time to present TTS, i.e. time 22). Then calculator 9 substitutes the integer N into a formula: (the time until the disc rotates thereby the target sector arrives at a position accessible by the head for the first time, i.e. time 21+the integer N×the rotation period of the magnetic disc drive). This formula produces target-sector-accessible-time 23, then calculator 9 outputs this time 23 to head-assembly-driving-controller 12.

Controller 12 calculates a speed and acceleration/deceleration pattern of head 1 so that head 1 can complete the seek to TTS at this speed and with this pattern within target-sector-accessible-time 23. Then controller 12 determines designated-current-value 24 for driving the head assembly based on these speed and pattern. Controller 12 outputs current-value 24 to head-assembly-driving-circuit 13. Driving circuit 13 outputs a drive current corresponding to current-value 24 to head-assembly-driver 3 via connection 25. Head-assembly-driver 3 controls an operation of head 1 with the drive current.

Next, a series of operations discussed above is detailed using FIG. 2 and FIG. 3.

Figure 2:
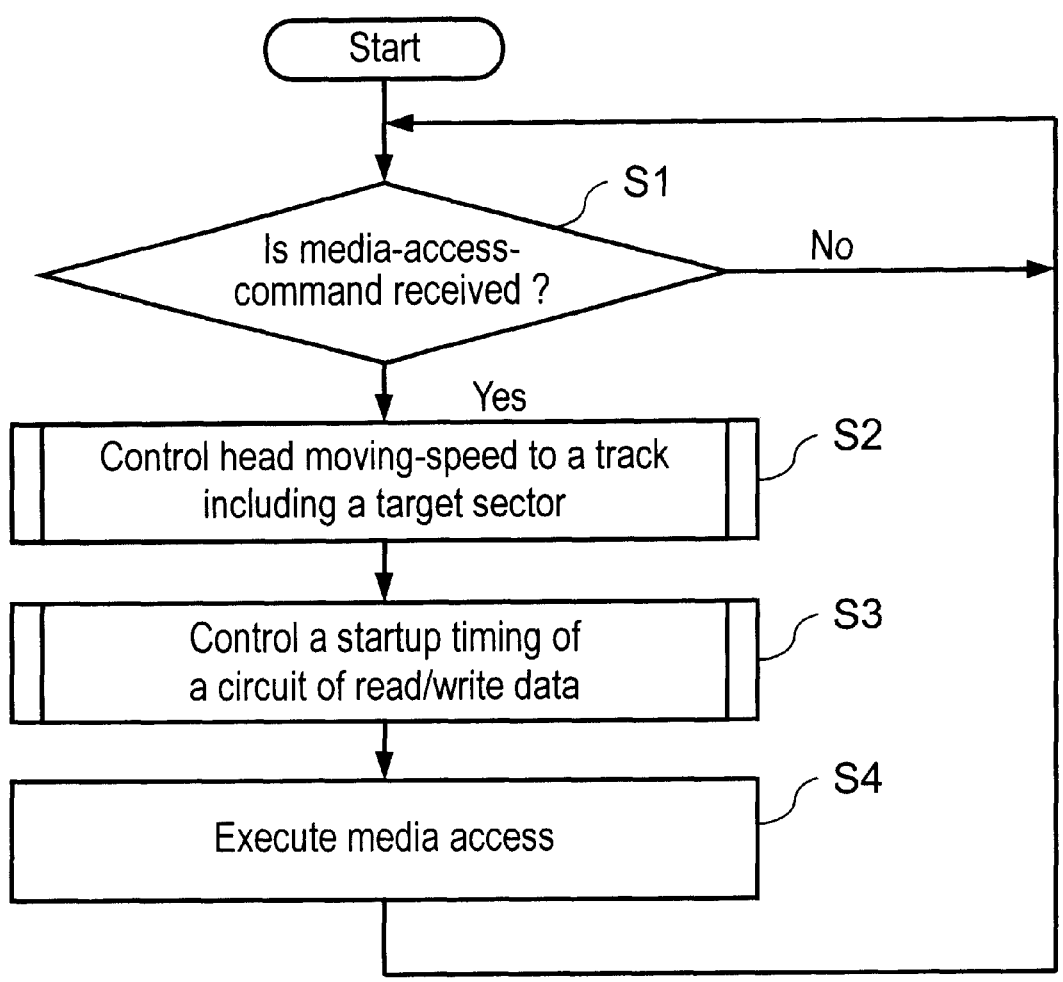
FIG. 2 is a flowchart showing an outline of whole process of the same disc driving apparatus shown in FIG. 1.
Figure 3:
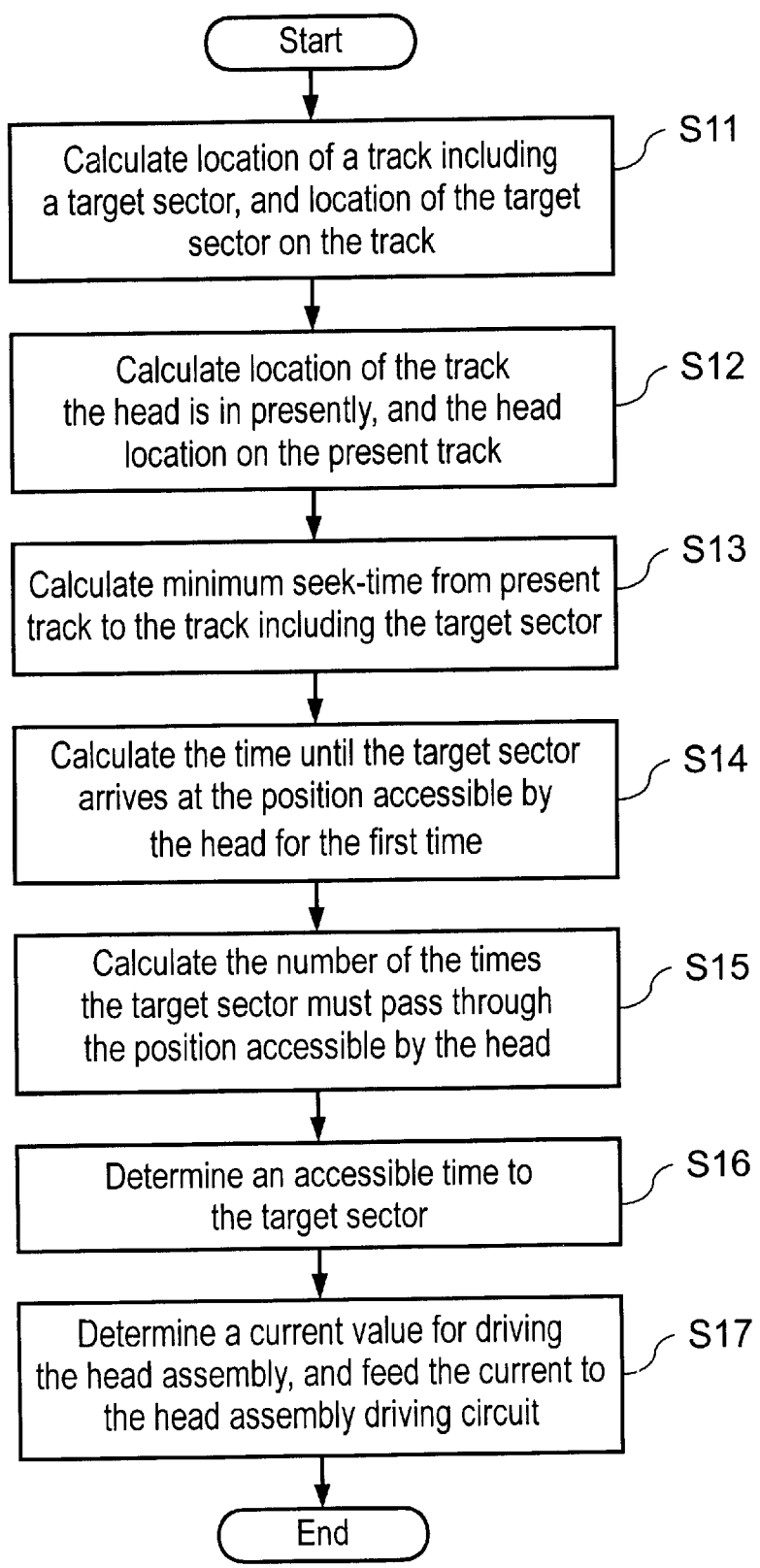
FIG. 3 is a flowchart showing a process of controlling a speed at which a head moves to TTS (the track including a target sector) of the same disc driving apparatus shown in FIG. 1.

FIG. 2 is a flowchart showing the outline of whole process of the disc driving apparatus, and FIG. 3 is a flowchart showing a process for controlling a head moving-speed at which the head moves to TTS.

In FIG. 2, step S1 determines whether or not a media-access-command from the higher level system is received. If the command is not received, step S1 is repeated until the command gets received. If the command gets received, the process moves on to step S2, and step S2 controls the head moving-speed to TTS, which is described in FIG. 3.

In FIG. 3, first, step S11 analyzes the content of the media-access-command received, and calculates the location of the track including the target sector to be accessed and the location of the target sector on the track. Second, step S12 calculates a location of a track at which the head is positioned presently, and a location of the head on the present track using head-position-data supplied from head position detector 4.

Next, step S13 calculates a minimum seek-time from present track to TTS using the location of TTS calculated in step S11 and S12, the track location where the head is positioned presently, and the driving capability of the head assembly of the disc-driving-apparatus. Then, step S14 calculates the time until the disc rotates thereby the target sector arrives at the position accessible by the head for the first time, based on the location of the target sector on the track calculated at step S11 and S12, the location of the head on the present track, and the rotation period of the disc.

Next, based on the value calculated at steps S13 and S14, step 15 calculates a minimum integer N (zero or greater than zero), i.e. the number of the times the target sector must pass through the position accessible by the head even if the head moves to TTS in a minimum time. Where the minimum integer N holds the relation: (the time until the target sector arrives at the position accessible by the head for the first time+the rotation period of the magnetic disc drive×the integer N)≧(the minimum seek time to TTS).

Next, step S16 determines the target sector accessible time obtained by substituting the integer N in a formula. The formula is this: (time until the target sector arrives at the position accessible by the head for the first time+the rotation period of the magnetic disc drive×the integer N)

Finally, step S17 calculates the speed and acceleration/ deceleration patterns of the head. With this speed and the patterns, the head completes the seek to TTS within the target-sector-accessible-time calculated at step S16. Then, step S17 determines the current value for driving the head assembly, and feed the current value to driving circuit 13. This concludes the process of controlling the head moving-speed to TTS.

The structure discussed above allows the head to move, just after the seek operation, at the speed and with the acceleration/deceleration pattern accessible to the target sector. Thus driving circuit 13 requires less electric current than the conventional method. As a result, the method of the present invention reduces power consumption at seek operation without extending an access time in comparison with conventional methods.

Second Embodiment

The differences between the second embodiment and the first embodiment mentioned above are as follows.

In the second embodiment, some elements are added to the structure of the first embodiment shown in FIG. 1. Target-sector-accessible-time-calculator 9 calculates target-sector-accessible-time 23 in the same procedure as the first embodiment responsive to designated-sector-accessing-command 18 supplied from higher level system 8, and then outputs time 23 to management unit 10. Management unit 10 subtracts a stabilization-time needed for circuit 11 of read/write data from target-sector-accessible-time 23, and determines a startup time for the circuit 11 of read/write data. Management unit 10 has a built-in circuit which can measure a time. When the startup time for circuit 11 passes, management unit 10 outputs startup command 26 to circuit 11 thereby controlling the startup time of circuit 11.

Figure 4:
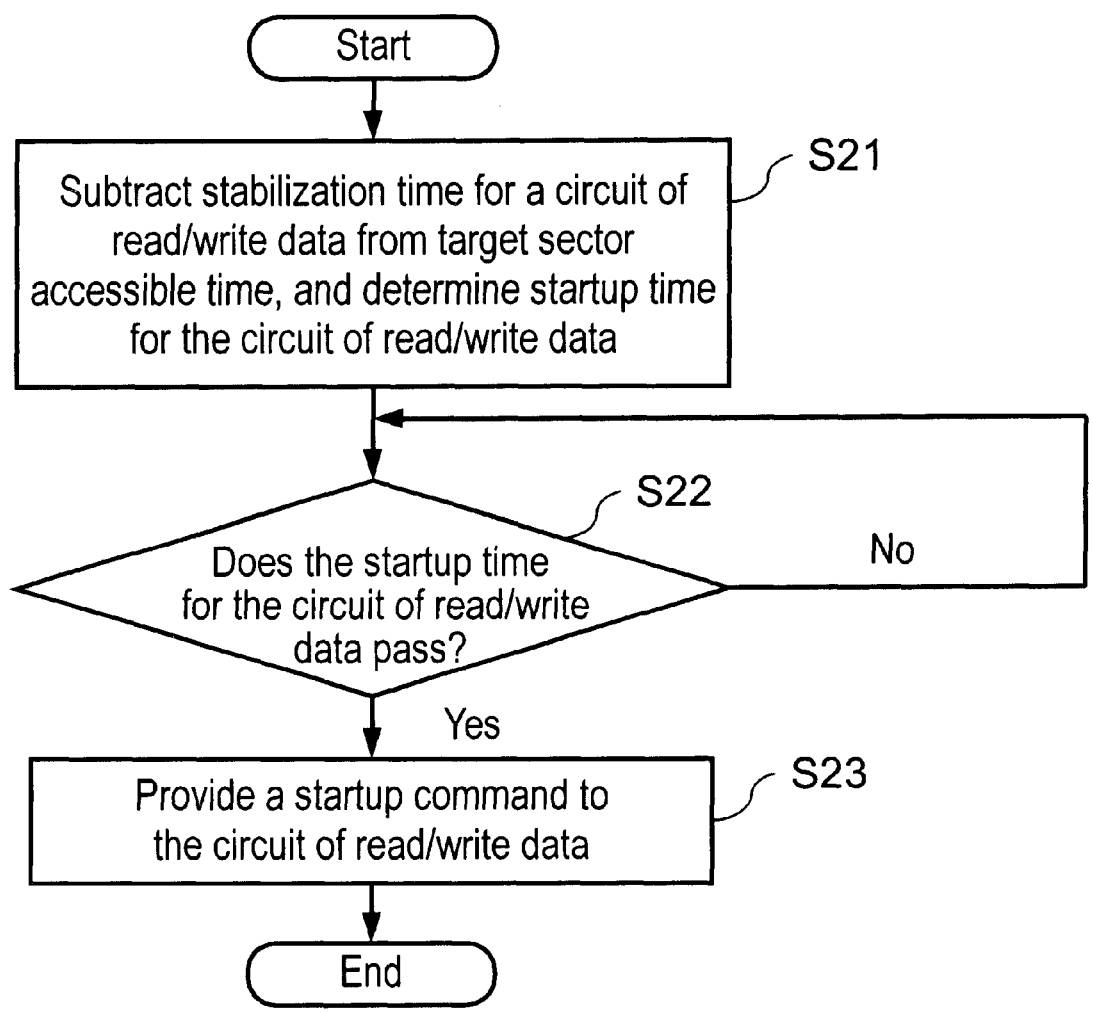
FIG. 4 is a flowchart showing a process of controlling a drive-timing for a circuit of read/write data of the same disc driving apparatus shown in FIG. 1.

Next, a series of operations mentioned above is detailed using FIGS. 2 and 4. FIG. 4 is a flowchart showing a process for controlling a startup timing for the circuit of read/write data in the disc driving apparatus.

In FIG. 2, step S2 controls the head moving-speed to TTS, and then the process moves on to step S3, and step S3 controls the startup timing for the circuit of read/write data depicted in FIG. 4.

In FIG. 4, first, step S21 subtracts the stabilization time for the circuit of read/write data from the target sector accessible time calculated at step S16 shown in FIG. 3—S16 controls the head moving-speed to TTS—and the step S21 determines the startup time for the circuit.

Second, step S22 determines whether or not the startup time of the circuit passes. If the time does not pass, step S22 is repeated until the time passes. If the time passes, the process moves on to step S23, and the step S23 outputs a startup command to circuit 11 of read/write data. This concludes the process for controlling the startup timing for the circuit of read/write data, and then the process moves on to step S4 shown in FIG. 2. Just before the target sector becomes accessible, the stabilization time of the circuit of read/write data passes away, and upon an access to the target sector becomes possible, a media access can be done immediately. This concludes a media-access-process responsive to the media-access-demand supplied from the higher level system, and then the process moves on back to step S1.

The structure discussed in the second embodiment allows the circuit of read/write data to be stabilized just before the target sector becomes accessible. Thus the operation efficiency of the circuit of read/write data is improved. As a result, the structure of the present invention reduces power consumption during read/write operation.

As mentioned above, the present invention includes the step for calculating the time the head can access to a target sector of a disc for the first time and the step for controlling the head to complete the seek to TTS within the time calculated. As result, the method of the present invention reduces power consumption at the seek-operation without extending an access time in comparison with conventional methods.

Further, the present invention includes the step for controlling a startup timing to allow the circuit of read/write data to be stabilized just before the target sector becomes accessible. Thus the step optimizes the operation efficiency of the circuit. As result, the method of the present invention reduces power consumption during read/write operation.

The embodiments of the present invention describe about a magnetic disc drive but it is needless to say that the present invention is applicable to disc drives using various media discs.

INDUSTRIAL APPLICABILITY OF THE INVENTION

The present invention provides a method of driving a head, a head driving device and a disc driving apparatus using the same method and device. The method and device reduce the power consumption during the seek-operation without extending an access time to the designated sector when an access to an designated sector is required, and are useful for controlling a head of a disc drive, especially a magnetic head of a magnetic disc drive.

What is claimed is:

1. A method for driving a head, said method comprising:
   (a) a step for determining a minimum integer N holding a relation of:
      (a target-sector-accessible-time)≧(a shortest time within which the head moves to a track including a target sector),
      when a sector-arrival-time is defined as a necessary time from an instance the head starts moving to the track including the target sector to another instance a disc rotates thereby the target sector arrives at a position accessible by the head for a first time, and the target-sector-accessible-time is a sum of the sector-arrival-time and a latency which is obtained by multiplying a disc-rotation-period by an integer N (zero or greater than zero);
   (b) a step for moving the head by determining a moving-speed and an acceleration/deceleration pattern so that the head finishes a head-moving and a head-positioning to the track including the target sector within the target-sector-accessible-time determined by substituting the integer N.

2. The method as defined in claim 1, further comprising a step for controlling an operation time of a circuit of read/write data by turning on the circuit when a time formed of a stabilization-time necessary for the circuit being subtracted from the target-sector-accessible-time got by substituting the integer N is passed away, and by turning off the circuit when necessary read/write operation is completed.

3. The method as defined in claim 1, wherein the head is a magnetic head and the disc is a magnetic disc.

4. The method as defined in claim 2, wherein the head is a magnetic head and the disc is a magnetic disc.

5. A head driving device comprising:
   (a) a head for accessing to a disc;
   (b) target-sector-accessible-time calculation means for determining a minimum integer N holding a relation:
      (a target-sector-accessible-time)≧(a shortest time within which a head moves to a track including a target sector),
      when a sector-arrival-time is defined as a necessary time from an instance the head starts moving to the track including the target sector to another instance a disc rotates thereby the target sector arrives at a position accessible by the head for a first time, and the target-sector-accessible-time is a sum of the sector-arrival-time and a latency which is obtained by multiplying a disc-rotation-period by an integer N (zero or greater than zero);
   (c) control means for moving the head by determining a moving-speed and an acceleration/deceleration pattern so that the head finishes a head-moving and a head-positioning to the track including the target sector within the target-sector-accessible-time determined by substituting the integer N.

6. The head driving device as defined in claim 5, said device further comprising turn-on time management means for controlling an operation time of a read/write circuit of data by turning on the circuit when a time, formed of a stabilization-time necessary for the circuit being subtracted from the target-sector-accessible-time got by substituting the integer N, is passed away, and by turning off the circuit when necessary read/write operation is completed.

7. The device as defined in claim 5, wherein said head is a magnetic head and the disc is a magnetic disc.

8. The device as defined in claim 6, wherein said head is a magnetic head and the disc is a magnetic disc.

9. A disc driving apparatus comprising:
   (a) a spindle device for rotating a disc;
   (b) a head driving device; said device comprising:
      (b-1) a head for accessing to the disc;
      (b-2) target-sector-accessible-time calculation means for determining a minimum integer N holding a relation:
         (a target-sector-accessible-time)≧(a shortest time within which the head moves to a track including a target sector),
         when a sector-arrival-time is defined as a necessary time from an instance the head starts moving to the track including the target sector to another instance a disc rotates thereby the target sector arrives at a position accessible by the head for a first time, and the target-sector-accessible-time is a sum of the sector-arrival-time and a latency which is obtained by multiplying a disc-rotation-period by an integer N (zero or greater than zero);
      (b-3) control means for moving the head by determining a moving-speed and an acceleration/deceleration pattern so that the head finishes a head-moving and a head-positioning to the track including the target sector within the target-sector-accessible-time determined by substituting the integer N.

10. The apparatus as defined in claim 9 further comprising turn-on time management means for controlling an operation time of a read/write circuit of data by turning on the circuit when a time, formed of a stabilization-time necessary for the circuit being subtracted from the target-sector-accessible-time got by substituting the integer N, is passed away, and by turning off the circuit when necessary read/write operation is completed.

11. The apparatus as defined in claim 9, wherein said head is a magnetic head and the disc is a magnetic disc.

12. The apparatus as defined in claim 10, wherein said head is a magnetic head and the disc is a magnetic disc.

* * * * *